(12) United States Patent
Schwarz et al.

(10) Patent No.: US 11,029,785 B2
(45) Date of Patent: *Jun. 8, 2021

(54) METHOD FOR IMPROVING ACCURACY OF TOUCH SCREEN EVENT ANALYSIS BY USE OF SPATIOTEMPORAL TOUCH PATTERNS

(71) Applicant: QEEXO, CO., Mountain View, CA (US)

(72) Inventors: Julia Schwarz, Pittsburgh, PA (US); Christopher Harrison, Pittsburgh, PA (US)

(73) Assignee: QEEXO, CO., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/798,139

(22) Filed: Feb. 21, 2020

(65) Prior Publication Data

US 2020/0209996 A1 Jul. 2, 2020

Related U.S. Application Data

(63) Continuation of application No. 14/495,041, filed on Sep. 24, 2014, now Pat. No. 10,606,417.

(51) Int. Cl.
*G06F 3/043* (2006.01)
*G06F 3/041* (2006.01)

(52) U.S. Cl.
CPC ............ *G06F 3/043* (2013.01); *G06F 3/0416* (2013.01); *G06F 2203/04104* (2013.01)

(58) Field of Classification Search
CPC ...... G06F 3/041; G06F 3/0416; G06F 3/0418; G06F 3/043; G06F 3/0433; G06F 3/044;
(Continued)

(56) References Cited

U.S. PATENT DOCUMENTS

| 2,008,028 | A | 7/1935 | McCortney |
| 2,430,005 | A | 11/1947 | Denneen |
| 3,354,531 | A | 11/1967 | Pryor |
| 3,441,790 | A | 4/1969 | McDonald |

(Continued)

FOREIGN PATENT DOCUMENTS

| CN | 1797305 A | 7/2006 |
| CN | 1928781 A | 3/2007 |

(Continued)

OTHER PUBLICATIONS

U.S. Appl. No. 13/958,427, CTFR—Final Rejection, dated Oct. 3, 2019, 2 pgs.

(Continued)

*Primary Examiner* — Keith L Crawley
(74) *Attorney, Agent, or Firm* — Kwan & Olynick LLP

(57) ABSTRACT

A method of classifying touch screen events uses known non-random patterns of touch events over short periods of time to increase the accuracy of analyzing such events. The method takes advantage of the fact that after one touch event, certain actions are more likely to follow than others. Thus if a touch event is classified as a knock, and then within 500 ms a new event in a similar location occurs, but the classification confidence is low (e.g., 60% nail, 40% knuckle), the classifier may add weight to the knuckle classification since this touch sequence is far more likely. Knowledge about the probabilities of follow-on touch events can be used to bias subsequent classification, adding weight to particular events.

15 Claims, 5 Drawing Sheets

(58) Field of Classification Search
CPC .......... G06F 3/0488; G06F 2203/0381; G06F 2203/04104; G06F 2203/04106; G06K 9/0002; G06K 9/00026; G06K 9/00087
See application file for complete search history.

(56) References Cited

U.S. PATENT DOCUMENTS

| | | |
|---|---|---|
| 4,561,105 A | 12/1985 | Crane |
| 4,597,932 A | 7/1986 | Kurihara |
| 4,686,332 A | 8/1987 | Greanias |
| 5,483,261 A | 1/1996 | Yasutake |
| 5,544,265 A | 8/1996 | Bozinovic |
| 5,596,656 A | 1/1997 | Goldberg |
| 5,615,285 A | 3/1997 | Beernink |
| 5,625,818 A | 4/1997 | Zarmer |
| 5,666,438 A | 9/1997 | Beernink |
| 5,867,163 A | 2/1999 | Kurtenbach |
| 5,933,514 A | 8/1999 | Ostrem |
| 6,028,593 A | 2/2000 | Rosenberg |
| 6,118,435 A | 9/2000 | Fujita |
| 6,208,330 B1 | 3/2001 | Hasegawa |
| 6,212,295 B1 | 4/2001 | Ostrem |
| 6,222,465 B1 | 4/2001 | Kumar |
| 6,246,395 B1 | 6/2001 | Goyins |
| 6,252,563 B1 | 6/2001 | Tada |
| 6,323,846 B1 | 11/2001 | Westerman |
| 6,337,698 B1 | 1/2002 | Keely, Jr. |
| 6,492,979 B1 | 12/2002 | Kent |
| 6,504,530 B1 | 1/2003 | Wilson et al. |
| 6,643,663 B1 | 11/2003 | Dabney |
| 6,707,451 B1 | 3/2004 | Nagaoka |
| 6,748,425 B1 | 6/2004 | Duffy |
| 6,772,396 B1 | 8/2004 | Cronin |
| 6,933,930 B2 | 8/2005 | Devige |
| 6,943,665 B2 | 9/2005 | Chornenky |
| 7,050,955 B1 | 5/2006 | Carmel |
| 7,084,884 B1 | 8/2006 | Nelson |
| 7,098,896 B2 | 8/2006 | Kushler |
| 7,212,197 B1 | 5/2007 | Schkolne |
| 7,443,396 B2 | 10/2008 | Ilic |
| 7,581,194 B2 | 8/2009 | Iwema |
| 7,982,724 B2 | 7/2011 | Hill |
| 8,086,971 B2 | 12/2011 | Radivojevic |
| 8,144,126 B2 | 3/2012 | Wright |
| 8,154,524 B2 | 4/2012 | Wilson |
| 8,154,529 B2 | 4/2012 | Sleeman |
| 8,170,346 B2 | 5/2012 | Ludwig |
| 8,199,126 B1 | 6/2012 | Taubman |
| 8,253,744 B2 | 8/2012 | Macura |
| 8,269,744 B2 | 9/2012 | Agari |
| 8,327,029 B1 | 12/2012 | Purser |
| 8,441,790 B2 | 5/2013 | Pance |
| 8,547,357 B2 | 10/2013 | Aoyagi |
| 8,624,878 B2 | 1/2014 | Sarwar |
| 8,670,632 B2 | 3/2014 | Wilson |
| 8,674,943 B2 | 3/2014 | Westerman |
| 8,743,091 B2 | 6/2014 | Bernstein |
| 8,760,395 B2 | 6/2014 | Kim |
| 8,762,332 B2 | 6/2014 | Keebler |
| 8,769,524 B2 | 7/2014 | Bhullar |
| 9,013,452 B2 | 4/2015 | Harrison et al. |
| 9,019,244 B2 | 4/2015 | Harrison |
| 9,030,498 B2 | 5/2015 | Galor |
| 9,052,772 B2 | 6/2015 | West |
| 9,060,007 B2 | 6/2015 | Keebler |
| 9,182,882 B2 | 11/2015 | Fowler |
| 9,329,688 B2 | 5/2016 | Harrison |
| 9,329,715 B2 | 5/2016 | Schwarz |
| 9,377,863 B2 | 6/2016 | Bychkov |
| 9,557,852 B2 | 1/2017 | Tsai |
| 9,612,689 B2 | 4/2017 | Harrison |
| 9,696,859 B1 | 7/2017 | Heller et al. |
| 9,864,453 B2 | 1/2018 | Munemoto |
| 10,082,935 B2 | 9/2018 | Harrison |
| 10,606,417 B2 | 3/2020 | Schwarz et al. |
| 10,642,404 B2 | 5/2020 | Harrison |
| 2002/0009227 A1 | 1/2002 | Goldberg |
| 2002/0057837 A1 | 5/2002 | Wilkinson |
| 2002/0070927 A1 | 6/2002 | Fujitsuka |
| 2002/0126161 A1 | 9/2002 | Kuzunuki |
| 2003/0048260 A1 | 3/2003 | Matusis |
| 2003/0110085 A1 | 6/2003 | Murren |
| 2003/0132922 A1 | 7/2003 | Philipp |
| 2003/0217873 A1 | 11/2003 | Paradiso |
| 2004/0012573 A1 | 1/2004 | Morrison |
| 2004/0021681 A1 | 2/2004 | Liao |
| 2004/0054711 A1 | 3/2004 | Multer |
| 2004/0141010 A1 | 7/2004 | Fitzmaurice |
| 2004/0160421 A1 | 8/2004 | Sullivan |
| 2004/0199867 A1 | 10/2004 | Brandenborg |
| 2004/0225730 A1 | 11/2004 | Brown |
| 2005/0083313 A1 | 4/2005 | Hardie-Bick et al. |
| 2005/0104867 A1 | 5/2005 | Westerman et al. |
| 2005/0131778 A1 | 6/2005 | Bennett |
| 2005/0146512 A1 | 7/2005 | Hill |
| 2005/0165596 A1 | 7/2005 | Adar |
| 2005/0278467 A1* | 12/2005 | Gupta ..................... G06F 3/038 710/65 |
| 2005/0289461 A1 | 12/2005 | Amado |
| 2006/0010400 A1 | 1/2006 | Dehlin |
| 2006/0026535 A1 | 2/2006 | Hotelling |
| 2006/0031746 A1 | 2/2006 | Toepfer |
| 2006/0152499 A1 | 7/2006 | Roberts |
| 2006/0173985 A1 | 8/2006 | Moore |
| 2006/0184617 A1 | 8/2006 | Nicholas |
| 2006/0217126 A1 | 9/2006 | Sohm |
| 2006/0230021 A1 | 10/2006 | Diab |
| 2006/0288329 A1 | 12/2006 | Gandhi |
| 2007/0011205 A1 | 1/2007 | Majjasie |
| 2007/0044010 A1 | 2/2007 | Sull |
| 2007/0075965 A1 | 4/2007 | Huppi |
| 2007/0085157 A1 | 4/2007 | Fadell |
| 2007/0100959 A1 | 5/2007 | Eichstaedt |
| 2007/0109279 A1 | 5/2007 | Sigona |
| 2007/0126716 A1 | 6/2007 | Haverly |
| 2007/0168367 A1 | 7/2007 | Dickinson |
| 2007/0176907 A1 | 8/2007 | Ishii |
| 2007/0186157 A1 | 8/2007 | Walker |
| 2007/0192674 A1 | 8/2007 | Bodin |
| 2007/0245020 A1 | 10/2007 | Ott, IV |
| 2007/0257767 A1 | 11/2007 | Beeson |
| 2007/0291297 A1 | 12/2007 | Harmon |
| 2008/0005666 A1 | 1/2008 | Sefton |
| 2008/0036743 A1 | 2/2008 | Westerman |
| 2008/0042978 A1 | 2/2008 | Perez-Noguera |
| 2008/0082941 A1 | 4/2008 | Goldberg |
| 2008/0103906 A1 | 5/2008 | Singh |
| 2008/0117168 A1 | 5/2008 | Liu |
| 2008/0126388 A1 | 5/2008 | Naaman |
| 2008/0141132 A1 | 6/2008 | Tsai |
| 2008/0155118 A1 | 6/2008 | Glaser |
| 2008/0158147 A1 | 7/2008 | Westerman |
| 2008/0158168 A1 | 7/2008 | Westerman |
| 2008/0158185 A1 | 7/2008 | Westerman |
| 2008/0168403 A1 | 7/2008 | Westerman |
| 2008/0180406 A1 | 7/2008 | Han |
| 2008/0244468 A1 | 10/2008 | Nishihara |
| 2008/0288347 A1 | 11/2008 | Sifry |
| 2008/0319932 A1 | 12/2008 | Yih |
| 2009/0025987 A1 | 1/2009 | Perski |
| 2009/0073144 A1 | 3/2009 | Chen |
| 2009/0095540 A1 | 4/2009 | Zachut |
| 2009/0150373 A1 | 6/2009 | Davis |
| 2009/0157206 A1 | 6/2009 | Weinberg |
| 2009/0174679 A1 | 7/2009 | Westerman |
| 2009/0178011 A1 | 7/2009 | Ording |
| 2009/0231275 A1 | 9/2009 | Odgers |
| 2009/0232355 A1 | 9/2009 | Minear |
| 2009/0254869 A1 | 10/2009 | Ludwig |
| 2009/0259628 A1 | 10/2009 | Farrell |
| 2009/0262637 A1 | 10/2009 | Badaye |
| 2009/0267893 A1* | 10/2009 | Kato ..................... G06F 3/03547 345/156 |
| 2009/0315835 A1 | 12/2009 | De Goes |

(56) References Cited

U.S. PATENT DOCUMENTS

| | | |
|---|---|---|
| 2009/0318192 A1 | 12/2009 | Leblanc |
| 2010/0036967 A1 | 2/2010 | Caine |
| 2010/0060602 A1 | 3/2010 | Agari |
| 2010/0085216 A1 | 4/2010 | Ms |
| 2010/0094633 A1 | 4/2010 | Kawamura |
| 2010/0123666 A1 | 5/2010 | Wickholm |
| 2010/0127997 A1 | 5/2010 | Park |
| 2010/0194703 A1 | 8/2010 | Fedor |
| 2010/0214267 A1 | 8/2010 | Radivojevic |
| 2010/0225601 A1 | 9/2010 | Homma |
| 2010/0251112 A1 | 9/2010 | Hinckley |
| 2010/0265185 A1 | 10/2010 | Oksanen |
| 2010/0271322 A1 | 10/2010 | Kondoh |
| 2010/0274622 A1 | 10/2010 | Kennedy |
| 2010/0279738 A1 | 11/2010 | Kim |
| 2010/0289754 A1 | 11/2010 | Sleeman |
| 2010/0302184 A1 | 12/2010 | East |
| 2010/0306649 A1 | 12/2010 | Russ |
| 2010/0309158 A1 | 12/2010 | Iwayama |
| 2010/0309933 A1 | 12/2010 | Stark |
| 2011/0003550 A1 | 1/2011 | Klinghult |
| 2011/0007000 A1 | 1/2011 | Lim |
| 2011/0018825 A1 | 1/2011 | Kondo et al. |
| 2011/0057670 A1 | 3/2011 | Jordan |
| 2011/0057885 A1 | 3/2011 | Lehtovirta |
| 2011/0074544 A1 | 3/2011 | D Souza |
| 2011/0074701 A1 | 3/2011 | Dickinson |
| 2011/0080349 A1 | 4/2011 | Holbein et al. |
| 2011/0133934 A1 | 6/2011 | Tan |
| 2011/0134063 A1 | 6/2011 | Norieda |
| 2011/0134083 A1 | 6/2011 | Norieda |
| 2011/0141066 A1 | 6/2011 | Shimotani |
| 2011/0145706 A1 | 6/2011 | Wilson |
| 2011/0164029 A1 | 7/2011 | King |
| 2011/0167391 A1 | 7/2011 | Momeyer et al. |
| 2011/0169763 A1 | 7/2011 | Westerman |
| 2011/0169778 A1 | 7/2011 | Nungester |
| 2011/0173235 A1 | 7/2011 | Aman |
| 2011/0175813 A1 | 7/2011 | Sarwar |
| 2011/0175821 A1 | 7/2011 | King |
| 2011/0175832 A1 | 7/2011 | Miyazawa et al. |
| 2011/0187652 A1 | 8/2011 | Huibers |
| 2011/0202848 A1 | 8/2011 | Ismalon |
| 2011/0210943 A1 | 9/2011 | Zaliva |
| 2011/0231290 A1 | 9/2011 | Narcisse |
| 2011/0238613 A1 | 9/2011 | Shehory |
| 2011/0246463 A1 | 10/2011 | Carson, Jr. |
| 2011/0246503 A1 | 10/2011 | Bender |
| 2011/0248927 A1 | 10/2011 | Michaelis |
| 2011/0248948 A1 | 10/2011 | Griffin |
| 2011/0261083 A1 | 10/2011 | Wilson |
| 2011/0298798 A1 | 12/2011 | Krah |
| 2011/0310040 A1 | 12/2011 | Ben-Shalom |
| 2012/0001875 A1 | 1/2012 | Li |
| 2012/0007821 A1 | 1/2012 | Zaliva |
| 2012/0007836 A1 | 1/2012 | Wu et al. |
| 2012/0011106 A1 | 1/2012 | Reid |
| 2012/0019562 A1 | 1/2012 | Park |
| 2012/0051596 A1 | 3/2012 | Darnell |
| 2012/0056846 A1 | 3/2012 | Zaliva |
| 2012/0078942 A1 | 3/2012 | Cai |
| 2012/0096041 A1 | 4/2012 | Rao |
| 2012/0113017 A1 | 5/2012 | Benko et al. |
| 2012/0120000 A1 | 5/2012 | Lucic |
| 2012/0131139 A1 | 5/2012 | Siripurapu |
| 2012/0146938 A1 | 6/2012 | Worfolk |
| 2012/0150871 A1 | 6/2012 | Hua |
| 2012/0158629 A1 | 6/2012 | Hinckley et al. |
| 2012/0200517 A1 | 8/2012 | Nikolovski |
| 2012/0206330 A1 | 8/2012 | Cao |
| 2012/0256845 A1 | 10/2012 | Noble |
| 2012/0262407 A1 | 10/2012 | Hinckley |
| 2012/0274583 A1 | 11/2012 | Haggerty |
| 2012/0280827 A1 | 11/2012 | Kashiwagi |
| 2012/0280927 A1 | 11/2012 | Ludwig |
| 2012/0287056 A1 | 11/2012 | Ibdah |
| 2012/0287076 A1 | 11/2012 | Dao |
| 2012/0313969 A1 | 12/2012 | Szymczyk |
| 2012/0324349 A1 | 12/2012 | Pop-Lazarov |
| 2013/0009896 A1 | 1/2013 | Zaliva |
| 2013/0014248 A1 | 1/2013 | McLaughlin |
| 2013/0027404 A1 | 1/2013 | Sarnoff |
| 2013/0030782 A1 | 1/2013 | Yogeswaren et al. |
| 2013/0038554 A1 | 2/2013 | West |
| 2013/0091123 A1 | 4/2013 | Chen |
| 2013/0100071 A1 | 4/2013 | Wright et al. |
| 2013/0176264 A1 | 7/2013 | Alameh et al. |
| 2013/0176270 A1 | 7/2013 | Cattivelli et al. |
| 2013/0179773 A1 | 7/2013 | Lee |
| 2013/0187883 A1 | 7/2013 | Lim |
| 2013/0215070 A1 | 8/2013 | Sasaki |
| 2013/0234982 A1 | 9/2013 | Kang |
| 2013/0246861 A1 | 9/2013 | Colley |
| 2013/0257757 A1 | 10/2013 | Kim |
| 2013/0265269 A1 | 10/2013 | Sharma |
| 2013/0285942 A1 | 10/2013 | Ko |
| 2013/0287273 A1 | 10/2013 | Huang |
| 2013/0307814 A1 | 11/2013 | Chang |
| 2013/0307828 A1 | 11/2013 | Miller |
| 2013/0316813 A1 | 11/2013 | Derome |
| 2013/0328813 A1 | 12/2013 | Kuo |
| 2013/0335333 A1 | 12/2013 | Kukulski |
| 2014/0007002 A1 | 1/2014 | Chang |
| 2014/0009401 A1 | 1/2014 | Bajaj |
| 2014/0022189 A1 | 1/2014 | Sheng et al. |
| 2014/0032880 A1 | 1/2014 | Ka |
| 2014/0037951 A1 | 2/2014 | Shigetomi Kiyoe |
| 2014/0043295 A1 | 2/2014 | Alameh |
| 2014/0071095 A1 | 3/2014 | Godsill et al. |
| 2014/0082545 A1 | 3/2014 | Zhai et al. |
| 2014/0104191 A1 | 4/2014 | Davidson et al. |
| 2014/0104192 A1 | 4/2014 | Davidson |
| 2014/0104274 A1 | 4/2014 | Hilliges |
| 2014/0109004 A1 | 4/2014 | Sadhvani |
| 2014/0168116 A1 | 6/2014 | Sasselli |
| 2014/0208275 A1 | 7/2014 | Mongia |
| 2014/0210788 A1 | 7/2014 | Harrison et al. |
| 2014/0210791 A1 | 7/2014 | Hanauer et al. |
| 2014/0240271 A1 | 8/2014 | Land |
| 2014/0240293 A1 | 8/2014 | McCaughan et al. |
| 2014/0240295 A1 | 8/2014 | Harrison |
| 2014/0253477 A1 | 9/2014 | Shim |
| 2014/0267065 A1 | 9/2014 | Levesque |
| 2014/0267085 A1 | 9/2014 | Li |
| 2014/0289659 A1 | 9/2014 | Harrison et al. |
| 2014/0300559 A1 | 10/2014 | Tanimoto |
| 2014/0327626 A1 | 11/2014 | Harrison |
| 2014/0331313 A1 | 11/2014 | Kim et al. |
| 2014/0368436 A1 | 12/2014 | Abzarian |
| 2015/0002405 A1 | 1/2015 | Kuan et al. |
| 2015/0035759 A1 | 2/2015 | Harrison |
| 2015/0077378 A1 | 3/2015 | Duffield |
| 2015/0089435 A1* | 3/2015 | Kuzmin ............... G06F 3/0488 715/773 |
| 2015/0145820 A1 | 5/2015 | Huang |
| 2015/0227229 A1 | 8/2015 | Schwartz et al. |
| 2015/0242009 A1 | 8/2015 | Xiao |
| 2015/0253858 A1 | 9/2015 | Koukoumidis |
| 2015/0293592 A1 | 10/2015 | Cheong |
| 2016/0012348 A1 | 1/2016 | Johnson |
| 2016/0018942 A1 | 1/2016 | Kang |
| 2016/0062545 A1 | 3/2016 | Lai |
| 2016/0077615 A1 | 3/2016 | Schwarz |
| 2016/0077650 A1 | 3/2016 | Durojaiye et al. |
| 2016/0077664 A1 | 3/2016 | Harrison |
| 2016/0085324 A1 | 3/2016 | Schwarz |
| 2016/0085333 A1 | 3/2016 | Harrison |
| 2016/0085372 A1 | 3/2016 | Munemoto |
| 2016/0098185 A1 | 4/2016 | Xiao |
| 2016/0117015 A1 | 4/2016 | Veneri |
| 2016/0156837 A1 | 6/2016 | Rodzevski |
| 2016/0171192 A1 | 6/2016 | Holz |
| 2016/0224145 A1 | 8/2016 | Harrison |
| 2016/0231865 A1 | 8/2016 | Harrison |

(56) References Cited

U.S. PATENT DOCUMENTS

| | | |
|---|---|---|
| 2016/0299615 A1 | 10/2016 | Schwarz |
| 2017/0024892 A1 | 1/2017 | Harrison |
| 2017/0060279 A1 | 3/2017 | Harrison |
| 2017/0153705 A1 | 6/2017 | Kim |

FOREIGN PATENT DOCUMENTS

| | | |
|---|---|---|
| CN | 101111817 A | 1/2008 |
| CN | 101299174 A | 11/2008 |
| CN | 101339477 A | 1/2009 |
| CN | 101410781 A | 4/2009 |
| CN | 101424974 A | 5/2009 |
| CN | 101438218 A | 5/2009 |
| CN | 101566894 A | 10/2009 |
| CN | 101763190 A | 6/2010 |
| CN | 101763193 A | 6/2010 |
| CN | 101921610 A | 12/2010 |
| CN | 101968696 A | 2/2011 |
| CN | 102153776 A | 8/2011 |
| CN | 102349035 A | 2/2012 |
| CN | 102362249 A | 2/2012 |
| CN | 102708862 | 10/2012 |
| CN | 102789332 A | 11/2012 |
| CN | 103150019 A | 6/2013 |
| CN | 104020878 A | 9/2014 |
| CN | 104160364 | 11/2014 |
| CN | 105431799 A | 3/2016 |
| CN | 106200861 A | 12/2016 |
| CN | 107077242 A | 8/2017 |
| CN | 107924279 A | 4/2018 |
| CN | 108803933 A | 11/2018 |
| EP | 0938039 A2 | 8/1999 |
| EP | 1659481 A2 | 5/2006 |
| EP | 1762926 A2 | 3/2007 |
| EP | 2136358 A1 | 12/2009 |
| EP | 2280337 A2 | 2/2011 |
| EP | 3028125 A4 | 3/2017 |
| EP | 3195095 A4 | 4/2018 |
| EP | 3198386 A4 | 4/2018 |
| EP | 3341829 A4 | 3/2019 |
| GB | 2344894 A | 6/2000 |
| GB | 2468742 A | 9/2010 |
| JP | H0969137 A | 3/1997 |
| JP | 2004213312 A | 7/2004 |
| JP | 2005018611 A | 1/2005 |
| JP | 2007524970 A | 8/2007 |
| JP | 2009543246 A | 12/2009 |
| JP | 2011028555 A | 2/2011 |
| JP | 2013519132 A | 5/2013 |
| JP | 2013532495 A | 8/2013 |
| KR | 20020075283 A | 10/2002 |
| KR | 20110061227 A | 6/2011 |
| KR | 20120100351 A | 9/2012 |
| WO | 9404992 A1 | 3/1994 |
| WO | 2006070044 A1 | 7/2006 |
| WO | 2006070044 A1 | 7/2006 |
| WO | 2008126347 A1 | 10/2008 |
| WO | 2009071919 A1 | 6/2009 |
| WO | 2011096694 A2 | 8/2011 |
| WO | 2012064034 A1 | 5/2012 |
| WO | 2012166277 A1 | 12/2012 |
| WO | 2013059488 A1 | 4/2013 |
| WO | 2013061998 A1 | 5/2013 |
| WO | 2014037951 A1 | 3/2014 |
| WO | 2014182435 A1 | 11/2014 |
| WO | 2015017831 A3 | 11/2015 |
| WO | 2016048848 A1 | 3/2016 |
| WO | 2016043957 A3 | 9/2016 |
| WO | 2017034752 A1 | 3/2017 |

OTHER PUBLICATIONS

U.S. Appl. No. 13/958,427, Non-Final Rejection, dated Apr. 6, 2020, 13 pgs.

U.S. Appl. No. 14/486,800, Non-Final Rejection, dated Feb. 21, 2020, 26 pgs.

U.S. Appl. No. 14/495,041, USPTO e-Office Action:Notice of Allowance and Fees Due (Ptol-85), dated Nov. 22, 2019, 9 pgs.

Asano, Futoshi, Goto, Masataka, Itou, Katunobu, Asoh, Hideki; Real-Time Sound Source Localization and Separation System and Its Application to Automatic Speech Recognition; Proceedings of Eurospeech, 2001; p. 1013-1016; 2001.

Benko, Hrvoje, Wilson, Andrew, Balakrishnan, Ravin; Sphere: Multi-Touch Interactions on a Spherical Display; Proceedings of UIST, 2008; pp. 77-86; 2008.

Burges, Christopher; A Tutorial on Support Vector Machines for Pattern Recognition; Data Mining and Knowledge Discovery, 2; pp. 121-167; 1998.

Cao, Xiang, Wilson, Andrew, Balakrishnan, Ravin, Hinckley, Ken, Hudson, Scott; ShapeTouch: Leveraging contact Shape on Interactive Surfaces; IEEE International Workshop on Horizontal Interactive Human Computer System (Tabletop); pp. 139-146; 2008.

Deyle, Travis, Palinko, Szabolcs, Poole, Erika Shehan, Starner, Thad; Hambone: A Bio-Acoustic Gesture Interface; Proceedings of ISWC, 2007; pp. 1-8; 2007.

Dietz Paul, Leigh, Darren; DiamondTouch: A Multi-User Touch Technology; ACM Symposium on User Interface Software & Technology (UIST); pp. 219-226; 2001.

Dietz, Paul, Harsham, Bret, Forlines, Clifton, Leigh, Darren, Yerazunis, Wiliam, Shipman, Sam, Schmidt-Nielsen, Bent, Ryall, Kathy; DT Controls: Adding Identity to Physical Interfaces; ACM Symposium on User Interface Software & Technology (UIST); pp. 245-252; 2005.

Final Office Action—dated Jun. 19, 2015—U.S. Appl. No. 13/958,427, filed Mar. 23, 2013.

Gutwin, Carl, Greenberg, Saul, Blum, Roger, Dyck, Jeff, Tee, Kimberly, McEwan, Gregor; Supporting Informal Collaboration in Shared-Workspace Groupware; Journal of Universal Computer Science, 14(9); pp. 1411-1434; 2008.

Hall, Mark, Frank, Eibe, Holmes, Geoffrey, Pfahringer, Bernhard, Reutemann, Peter, Witten, Ian; The WEKA Data Mining Software: An Update; SIGKDD Explorations, 11(1); pp. 10-18; 2009.

Harrison, Chris, Hudson, Scott; Scratch Input: Creating Large, Inexpensive, Unpowered and Mobile Finger Input Surfaces; Proceedings of UIST, 2008; pp. 205-208; 2008.

Harrison, Chris, Tan, Desney, Morris, Dan; Skinput: Appropriating the Body as an Input Surface; Proceedings of CHI, 2010; pp. 453-462; 2010.

Hartmann Bjorn, Ringel Morris, Meredith, Benko, Hrvoje, Wilson, Andrew; Augmenting Interactive Tables with Mice & Keyboards; Proceedings of UIST, 2009; pp. 149-152; 2009.

Hinckley, Ken, Song, Hyunyoung; Sensor Synaesthesia: Touch in Motion, and Motion in Touch; Proceedings of CHI, 2011; pp. 801-810; 2011.

Hinckley, Ken, Yatani, Koji, Pahud, Michel, Coddington, Nicole, Rodenhouse, Jenny, Wilson, Andy, Benko, Hrvoje, Buxton, Bill; Pen + Touch=New Tools; Proceedings of UIST, 2010; pp. 27-36; 2010.

Hinkley, Ken, Yatani, Koji, Pahud, Michel, Coddington, Nicole, Rodenhouse, Jenny, Wilson, Andy, Benko, Hrvoje, Buxton, Bill; Manual Deskterity: An Exploration of Simultaneous Pen + Touch Direct Input; Proceedings of CHI, 2010; pp. 2793-2802; 2010.

Holz, Christian, Baudisch, Patrick; the Generalized Perceived Input Point Model and How to Double Touch Accuracy by Extracting Fingerprints; Proceedings of CHI, 2010; pp. 581-590; 2010.

International Search Report and Written Opinion received for PCT Application No. PCT/US2014/049485 dated Nov. 17, 2014, 13 pages.

International Search Report and Written Opinion received for PCT Application No. PCT/US2014/049485 dated Nov. 17, 2014.

Kaltenbrunner, Martin, Bencina, Ross; reacTIVision: A Computer-Vision Framework for Table-Based Tangible Interaction; Proceedings of TEI, 2007; pp. 69-74; 2007.

Matsushita, Nobuyuki, Rekimoto, Jun; HoloWall: Designing a Finger, Hand, Body, and Object Sensitive Wall; Proceedings of UIST, 1997; pp. 209-210; 1997.

(56) References Cited

OTHER PUBLICATIONS

Olwal, Alex, Wilson, Andrew; SurfaceFusion: Unobtrusive Tracking of Everyday Objects in Tangible User Interfaces; Proceedings of GI, 2008; pp. 235-242; 2008.
Paradiso, Joseph, Hsiao, Kai-yuh, Strickon, Joshua, Lifton, Joshua, Adler, Ari; Sensor Systems for Interactive Surfaces; IBM Systems Journal, 39(3-4); pp. 892-914; 2000.
Paradiso, Joseph, Leo, Che King; Tracking and Characterizing Knocks Atop Large Interactive Displays; Sensor Review, 25(2); pp. 134-143; 2005.
Patten, James, Ishii, Hiroshi, Hines, Jim, Pangaro, Gian; Sensetable: A Wireless Object Tracking Platform for Tangible User Interfaces; Proceedings of CHI, 2001; pp. 253-260; 2001.
Rekimoto, Jun, Saitoh, Masanori; Augmented Surfaces: A Spatially Continuous Work Space for Hybrid Computing Environments; Proceedings of CHI, 1999; pp. 378-385; 1999.
Rekimoto, Jun, Sciammarella, Eduardo; ToolStone: Effective use of the Physical Manipulation Vocabularies of Input Devices; Proceedings of UIST, 2000; pp. 109-117; 2000.
Rekimoto, Jun; SmartSkin: An Infrastructure for Freehand Manipulation on Interactive Surfaces; Proceedings of CHI, 2002; pp. 113-120; 2002.
U.S. Appl. No. 13/958,427, filed Aug. 2, 2013, titled: "Capture of Vibro-Acoustic Data Used to Touch Types."
U.S. Appl. No. 13/958,427, filed Aug. 2, 2013. titled: "Capture of Vibro-Acoustic Data Used to Determine Touch Types."
Vandoren, Peter, Van Laerhoven, Tom, Claesen, Luc, Taelman, Johannes, Di Fiore, Fabian, Van Reeth, Frank, Flerackers, Eddy; DIP-IT: Digital Infrared Painting on an Interactive Table; Proceedings of CHI, 2008; pp. 2901-2906; 2008.
Wang, Feng, Ren, Xiangshi; Empirical Evaluation for Finger Input Properties in Multi-Touch Interaction; Proceedings of CHI, 2009; pp. 1063-1072; 2009.
Non-Final Office Action received for U.S. Appl. No. 14/242,127 dated Jun. 2, 2015, 33 pages.
Final Office Action received for U.S. Appl. No. 14/242,127 dated Sep. 18, 2015, 28 pages.
Non-Final Office Action received for U.S. Appl. No. 14/242,127 dated Dec. 28, 2015, 38 pages.
Final Office Action received for U.S. Appl. No. 14/242,127 dated Mar. 31, 2016, 34 pages.
Notice of Allowance received for U.S. Appl. No. 14/242,127 dated Apr. 13, 2016, 18 pages.
Notice of Allowance received for U.S. Appl. No. 14/242,127 dated Sep. 2, 2016, 16 pages.
Non-Final Office Action received for U.S. Appl. No. 15/206,554 dated Sep. 21, 2016, 36 pages.
Japanese Office Action for Japanese Patent Application No. 2014-537253 dated May 16, 2017, 5 pages (including English Translation).
European Search Report received for European Patent Application Serial No. 12842495.9, dated Jul. 24, 2015, 7 Pages.
Japanese Office Action for Japanese Patent Application No. 2017-049566 dated Jun. 5, 2018, 7 pages (including English Translation).
Final Office Action received for U.S. Appl. No. 15/073,407, dated Dec. 20, 2016, 49 pages.
Final Office Action received for U.S. Appl. No. 14/219,919, dated Aug. 26, 2016, 24 pages.
Non-Final Office Action received for U.S. Appl. No. 14/191,329, dated on Feb. 2, 2017, 20 pages.
Non-Final Office Action received for U.S. Appl. No. 14/486,800, dated Dec. 1, 2016, 29 pages.
Non-Final Office Action received for U.S. Appl. No. 14/684,407, dated Sep. 14, 2018, 24 pages.
Final Office Action received for U.S. Appl. No. 14/834,434, dated May 1, 2017, 18 pages.
Non-Final Office Action received for U.S. Appl. No. 14/751,589, dated Jun. 13, 2016, 20 pages.
International Search Report and Written Opinion for PCT/US2016/044552; dated Oct. 17, 2016, 14 pages.
International Search Report and Written Opinion for PCT/US2016/040194; dated Sep. 19, 2016, 7 pages.
International Search Report and Written Opinion for PCT/US2015/051582; dated Feb. 26, 2016, 12 pages.
International Search Report and Written Opinion for PCT/US2015/051106; dated Jan. 28, 2016, 9 pages.
International Search Report and Written Opinion for PCT/US2015/047616; dated Jul. 1, 2016, 7 pages.
European Patent Office Extended Search Report for EP 14 83 2247; dated Feb. 23, 2017, 11 pages.
European Patent Office Extended Search Report for EP 14 79 4212; dated Nov. 9, 2016, 8 pages.
International Search Report and Written Opinion received for PCT Application No. PCT/US2014/033380 dated Mar. 13, 2015, 7 pages.
Non-Final Office Action—dated Oct. 2, 2015 U.S. Appl. No. 14/486,800, filed Sep. 15, 2014, 21 pages.
Non-Final Office Action received dated Nov. 5, 2015 U.S. Appl. No. 13/887,711, 19 pages.
International Search Report and Written Opinion for PCT/US2015/051355; dated Dec. 15, 2015, 9 pages.
International Search Report and Written Opinion for PCT/US2015/047428; dated Nov. 27, 2015, 6 pages.
International Search Report and Written Opinion for PCT/US2015/050570; dated Dec. 17, 2015, 8 pages.
Non-Final Office Action—dated Oct. 7, 2015 U.S. Appl. No. 14/495,041, 14 pages.
Non-Final Office Action dated Jun. 13, 2016 in U.S. Appl. No. 15/073,407, 49 pages.
U.S. Appl. No. 13/849,698, filed Mar. 25, 2013, titled: "Method and System for Activating Different Interactive Functions Using Different Types of Finger Contacts." 52 pages.
U.S. Appl. No. 13/780,494, filed Feb. 28, 2013, titled: "Input Tools Having Viobro-Acoustically Distinct Regions and Computing Device for Use With the Same." 34 pages.
Final Office Action dated Jul. 12, 2017 in U.S. Appl. No. 14/495,041, 14 pages.
Final Office Action dated Jul. 18, 2017 in U.S. Appl. No. 14/191,329, 17 pages.
Final Office Action dated Jun. 8, 2016 in U.S. Appl. No. 14/495,041, 16 pages.
Final Office Action dated Mar. 7, 2018 in U.S. Appl. No. 14/219,919, 21 pages.
Final Office Action dated May 6, 2016 in U.S. Appl. No. 14/191,329, 17 pages.
Final Office Action dated May 13, 2016 in U.S. Appl. No. 14/390,831, 6 pages.
Final Office Action dated May 20, 2016 in U.S. Appl. No. 14/503,894, 17 pages.
Final Office Action dated Nov. 9,2016 in U.S. Appl. No. 14/612,089, 11 pages.
Final Office Action dated Nov. 23, 2015 in U.S. Appl. No. 14/668,870, 14 pages.
Final Office Action dated Sep. 6, 2017 in U.S. Appl. No. 14/486,800, 17 pages.
International Search Report and Written Opinion dated Jul. 8, 2013 in International Application No. PCT/CA2013/000292, 9 pages.
International Search Report and Written Opinion dated Jun. 6, 2012 in International Patent Application No. PCT/CA2012/050127, 10 pages.
"Making it Easier to Share With Who You Want," Facebook, Aug. 23, 2011, last updated on Dec. 12, 2012 retrieved from https://www.facebook.com/notes/facebook/making-it-easier-to-share-with-who-you-want/10150251867797131/, retrieved on Jun. 1, 2018, 14 pages.
Cheng, B. et al., "SilentSense: Silent User Identification via Dynamics of Touch and Movement Behavioral Biometrics," Cryptography and Security (cs CR); Human-Computer Interaction, pp. 9, Aug. 31, 2013, 9 pages.
S. Furui, "Digital Speech Processing, synthesis, and recognition" Marcel Dekker, Inc. 2001. 40 pages.
English Translation of Chinese Office Action dated Nov. 3, 2017 in Chinese Application No. 201480002856.0, 12 pages.

(56) References Cited

OTHER PUBLICATIONS

English Translation of Final Rejection dated Dec. 12, 2014 in Korean Patent Application No. 10-2014-0027979, 3 pages.
English Translation of First Office Action dated Oct. 11, 2017 in Chinese Patent Application No. 20150209998.0, 10 pages.
English Translation of Notification of Reason for Refusal dated Jul. 10, 2014 in Korean patent application No. 10-2014-0027979, 3 pages.
Final Office Action dated Jan. 5, 2018 in U.S. Appl. No. 14/503,894, 16 pages.
Communication pursuant to Article 94(3) EPC dated Feb. 26, 2018 in European Patent Application No. 14785422.8, 7 pages.
Communication pursuant to Article 94(3) EPC dated Mar. 5, 2018 in European Patent Application No. 14794212.2, 5 pages.
Extended European Search Report dated Apr. 16, 2018 in European Application No. 15845310.0, 7 pages.
Extended European Search Report dated Aug. 11, 2016 in European Patent Application No. 14785422.8, 8 Pages.
Extended European Search Report dated Aug. 25, 2017 in European Patent Application No. 157 48667.1, 10 pages.
Extended European Search Report dated Jul. 22, 2014 in European Patent Application No. 12755563.9, 5 Pages.
Extended European Search Report dated Mar. 16, 2018 in European Patent Application No. 15842839.1, 7 Pages.
Extended European Search Report dated Mar. 19, 2018 in European Patent Application No. 15840819.5, 9 Pages.
Extended European Search Report dated Mar. 19, 2018 in European Patent Application No. 15843933.1, 8 Pages.
Extended European Search Report dated Mar. 27, 2018 in European Patent Application No. 15843989.3, 8 Pages.
Extended European Search Report dated May 14, 2018 in European Patent Application No. 15847469.2, 11 pages.
Weidong, S. et al., "SenGuard: Passive user identification on smartphones using multiple sensors," IEEE 7th International Conference on Wireless and Mobile Computing, Networking and Communications (WiMob), pp. 141-148, 2011.
Final Office Action dated Feb. 9, 2016 in U.S. Appl. No. 14/486,800, 14 pages.
Final Office Action dated Feb. 26, 2016 in U.S. Appl. No. 14/492,604, 16 pages.
Non-Final Office Action dated Sep. 9, 2016 in U.S. Appl. No. 13/887,711, 24 pages.
Non-Final Office Action dated Sep. 29, 2016 in U.S. Appl. No. 14/834,434, 12 pages.
Pedro, L et al., "Augmenting touch interaction through acoustic sensing", Proceedings of the ACM International 3onference on Interactive Tabletops and Surfaces, pp. 53-56, Nov. 13-16, 2011.
Sarah, M. K. et al., "A Personal Touch—Recognizing Users Based on Touch Screen Behavior," PhoneSense'12, Nov. 6, 2012, Toronto, ON, Canada, Nov. 6, 2012, 5 pages.
"Swype Advanced Tips", [http://www.swype.com/tips/advanced-tips], Jun. 25, 2014, retrieved via the Wayback Machine on Jun. 29, 2018, [https:web.archive.Org/web/20140625073212/http://www.swype.com/tips/advanced-tips], 2 Pages.
"Swype Basics", [http://www.swype.com/tips/swype-basics], retrieved via the Wayback Machine dated Jun. 14, 2014,—retrieved via the Wayback Machine on Jun. 29, 2018, [https:web.archive.org/web/20140614200707/http://www.swype. mm/tips/swype-basics, 2 pages.
"Swype Tips", [http://www.swype.com/category/tips], Jul. 2, 2014, retrieved via the Wayback Machine on Jun. 29, 2018, [https:web.archive.Org/web/20140702102357/http://www.swype.com/category/tips, 2 pages.
Non-Final Office Action dated Apr. 15, 2015 in U.S. Appl. No. 13/856,414, 17 pages.
Non-Final Office Action dated Apr. 26, 2018 in U.S. Appl. No. 14/495,041, 15 pages.
Non-Final Office Action dated Dec. 20, 2017 in U.S. Appl. No. 14/834,434, 12 pages.
Non-Final Office Action dated Jul. 8, 2015 in U.S. Appl. No. 14/191,329, 18 pages.
Non-Final Office Action dated Jul. 11, 2017 in U.S. Appl. No. 14/390,831, 79 pages.
Non-Final Office Action dated Jul. 17, 2017 in U.S. Appl. No. 15/073,407, 8 pages.
Non-Final Office Action dated Jul. 19, 2017 in U.S. Appl. No. 14/219,919, 20 pages.
Non-Final Office Action dated Jun. 9, 2016 in U.S. Appl. No. 14/612,089, 11 pages.
Non-Final Office Action dated May 7, 2018 in U.S. Appl. No. 14/191,329, 17 pages.
Non-Final Office Action dated May 9, 2018 in U.S. Appl. No. 13/887,711, 27 pages.
Non-Final Office Action dated Nov. 15, 2017 in U.S. Appl. No. 15/198,062, 24 pages.
Non-Final Office Action dated Nov. 24, 2015 in U.S. Appl. No. 14/191,329, 31 pages.
Non-Final Office Action dated Oct. 18, 2017 in U.S. Appl. No. 15/406,770, 12 pages.
Non-Final Office Action dated Oct. 19, 2015 in U.S. Appl. No. 14/668,870, 6 pages.
Non-Final Office Action dated Oct. 23, 2014 in U.S. Appl. No. 14/275,124, 10 pages.
Non-Final Office Action dated Oct. 25, 2013 in U.S. Appl. No. 13/410,956, 8 pages.
Non-Final Office Action dated Oct. 28, 2015 in U.S. Appl. No. 14/390,831, 22 pages.
Non-Final Office Action dated Sep. 8, 2016 in U.S. Appl. No. 14/492,604, 14 pages.
Notice of Allowance dated Jan. 26, 2015 in U.S. Appl. No. 13/849,698, 27 pages.
Notice of Allowance dated Dec. 6, 2016 in U.S. Appl. No. 14/751,589, 27 pages.
Non-Final Office Action dated Jul. 30, 2018 in U.S. Appl. No. 15/406,770, 20 pages.
Notice of Allowance dated Feb. 2, 2015 in U.S. Appl. No. 13/780,494, 43 pages.
Non-Final Office Action dated Jun. 26, 2018 in U.S. Appl. No. 14/486,800, 25 pages.
Final Office Action dated Aug. 8, 2018 in U.S. Appl. No. 14/834,434, 19 pages.
Non-Final Office Action dated Sep. 2, 2014 in U.S. Appl. No. 13/863,193, 41 pages.
Final Office Action dated Mar. 4, 2015 in U.S. Appl. No. 13/863,193, 50 pages.
Non-Final Office Action dated Jan. 7, 2016 in U.S. Appl. No. 13/863,193, 58 pages.
Final Office Action dated Sep. 15, 2016 in U.S. Appl. No. 13/863,193, 50 pages.
Non-Final Office Action dated Apr. 6, 2017 in U.S. Appl. No. 13/863,193, 70 pages.
Final Office Action dated Jan. 9, 2018 in U.S. Appl. No. 13/863,193, 50 pages.
Notice of Allowance dated May 22, 2018 in U.S. Appl. No. 13/863,193, 73 pages.
Notice of Allowance dated Sep. 1, 2016 in U.S. Appl. No. 13/856,414, 28 pages.
Chinese Office Action for Chinese Patent Application No. 201510240522.3 dated Jun. 28, 2018, 30 pages (including English Translation).
Japanese Office Action dated Aug. 1, 2018 for Japanese Patent Application No. 2017-049566, 9 pages (including English translation).
Korean Office Action dated Jan. 10, 2019 for Korean Patent Application No. 2014-7010323, 11 pages (including English translation).
Final Office Action received for U.S. Appl. No. 15/075,648 dated Dec. 21, 2018, 13 pages.
Non-Final Office Action received for U.S. Appl. No. 15/815,679 dated Sep. 28, 2018, 69 pages.
Final Office Action received for U.S. Appl. No. 15/198,062 dated Sep. 6, 2018, 32 pages.
Non-Final Office Action received for U.S. Appl. No. 16/126,175 dated Nov. 1, 2018, 86 pages.

(56) References Cited

OTHER PUBLICATIONS

Third Chinese Office Action received for Chinese Patent Application No. 201480022056.5 dated Jul. 19, 2018, 6 pages (with English translation).
Communication pursuant to Article 94(3) EPC for European Patent Application No. 14785422.8 dated Nov. 22, 2018, 5 pages.
Communication pursuant to Article 94(3) EPC for European Patent Application No. 15845310.0 dated Jan. 3, 2019, 4 pages.
Communication pursuant to Article 94(3) EPC for European Patent Application No. 15840819.5 dated Jan. 23, 2019, 6 pages.
Chinese First Office Action received for Chinese Patent Application No. 201510240372.6 dated Sep. 27, 2018, 18 pages (including English Translation).
Communication pursuant to Article 94(3) EPC for European Patent Application No. 15843933.1 dated Jan. 23, 2019, 6 pages.
Chinese Search Report received for Chinese Patent Application No. 201580053216.7, dated Apr. 16, 2019, 2 Pages.
European Search Report received for European Patent Application No. 16839786.7, dated Feb. 12, 2019, 8 Pages.
Communication pursuant to Rules 70(2) and 70a(2) EPC received for European Patent Application No. 16839786.7 dated Mar. 1, 2019, 1 page.
Chinese Second Office Action received for Chinese Patent Application No. 201580000833.0 dated Jan. 15, 2018, 17 pages.
European Search Report received for European Patent Application No. 16818725.0, dated Dec. 21, 2018, 8 Pages.
Communication pursuant to Rules 70(2) and 70a(2) EPC received for European Patent Application No. 16818725.0 dated Jan. 8, 2019, 1 page.
First Office Action received for Canadian Patent Application No. 2869699, dated Nov. 27, 2014, 3 pages.
Second Office Action received for Canadian Patent Application No. 2869699, dated Jun. 14, 2016, 4 pages.
Third Office Action received for Canadian Patent Application No. 2869699, dated Jan. 9, 2017, 3 pages.
First Examination report received for Australian Patent Application No. 2012225130, dated Feb. 9, 2015, 4 pages.
First Office Action received for Canadian Patent Application No. 2802746, dated Apr. 9, 2013, 3 pages.
Final Office Action received for U.S. Appl. No. 14/684,407 dated Jun. 10, 2019, 26 pages.
Final Office Action received for U.S. Appl. No. 14/684,407 dated Sep. 20, 2019, 26 pages.
Final Office Action received for U.S. Appl. No. 14/495,041 dated Aug. 9, 2019, 26 pages.
Non-Final Office Action received for U.S. Appl. No. 14/834,434 dated Aug. 5, 2019, 19 pages.
Final Office Action received for U.S. Appl. No. 16/126,175 dated Aug. 2, 2019, 161 pages.
Communication pursuant to Article 94(3) EPC received for European Patent Application No. 14832247.2 dated May 3, 2019, 7 pages.
Final Office Action received for U.S. Appl. No. 15/075,648 dated May 31, 2019, 17 pages.
Non-Final Office Action received for U.S. Appl. No. 15/836,798 dated Jul. 5, 2019, 95 pages.
Non-Final Office Action received for U.S. Appl. No. 14/191,329 dated Jul. 16, 2019, 30 pages.
Chinese First Office Action received for Chinese Patent Application Serial No. 201580051873.8 dated Jun. 21, 2019, 15 pages (Including English Translation).
Final Office Action received for U.S. Appl. No. 13/887,711 dated Jul. 25, 2019, 24 pages.
Chinese Second Office Action received for Chinese Patent Application No. 201510240372.6 dated May 15, 2019, 16 Pages (including English Translation).
"Mimio", http://www.mimio.com, retrieved Jul. 8, 2019, 8 pages.
U.S. Appl. No. 14/191,329, filed Feb. 26, 2014, titled "Using Capacitive Images for Touch Type Classification", 42 pages.

U.S. Appl. No. 13/887,711, filed May 6, 2013, titled: "Using Finger Touch Types to Interact with Electronic Devices." 42 pages.
U.S. Appl. No. 14/492,604, filed Sep. 22, 2014, titled: "Method and Apparatus for Improving Accuracy of Touch Screen Event Analysis by Use of Edge Classification." 35 pages.
U.S. Appl. No. 14/483,150, filed Sep. 11, 2014, titled: "Method and Apparatus for Differentiating Touch Screen Users Based on Touch Event Analysis." 38 pages.
U.S. Appl. No. 14/495,041, filed Sep. 24, 2014, titled: "Method for Improving Accuracy of Touch Screen Event Analysis by Use of Spatiotemporal Touch Patterns." 34 pages.
U.S. Appl. No. 14/242,127, filed Apr. 1, 2014, titled: "Method and Apparatus for Classifying Touch Events on a Touch Sensitive Surface.", 36 pages.
International Search Report and Written Opinion received for PCT Application No. PCT/US2014/034977 dated Sep. 18, 2014, 8 pages.
International Search Report and Written Opinion received for International Patent Application No. PCT/US2012/060865 dated Mar. 29, 2013, 10 pages.
Chinese Office Action (including English translation) for App. No. CN201810617137.X, dated Oct. 28, 2020, 12 pages.
Non-Final Office Action received for U.S. Appl. No. 13/958,427, dated Nov. 10, 2016, 22 pages.
Final Office Action dated Nov. 28, 2014 in U.S. Appl. No. 13/849,698, 21 pages.
Non-Final Office Action dated Jun. 24, 2014 in U.S. Appl. No. 13/849,698, 21 pages.
Non-Final Office Action dated Oct. 16, 2014 in U.S. Appl. No. 13/780,494, 10 pages.
Final Office Action dated Jun. 30, 2017 in U.S. Appl. No. 13/958,427, 15 pages.
Final Office Action dated Mar. 28, 2016 in U.S. Appl. No. 13/958,427, 16 pages.
Non-Final Office Action dated Apr. 16, 2018 in U.S. Appl. No. 13/958,427, 14 pages.
Non-Final Office Action dated Oct. 8, 2015 in U.S. Appl. No. 13/958,427, 15 pages.
U.S. Appl. No. 14/483,150, filed Sep. 11, 2014, titled: "Method and Apparatus for Differentiating Touch Screen Users Based on Touch Event Analysis."
U.S. Appl. No. 14/492,604, filed Sep. 22, 2014, titled: "Method and Apparatus for Improving Accuracy of Touch Screen Event Analysis by Use of Edge Classification."
U.S. Appl. No. 14/495,041, filed Sep. 24, 2014, titled: "Method for Improving Accuracy of Touch Screen Event Analysis by Use of Spatiotemporal Touch Patterns."
English Translation of Final Rejection dated Apr. 27, 2015 in Korean Patent Application No. 10-2014-0027979, 3 pages.
English Translation of First Office Action dated Feb. 27, 2017 in Chinese Application No. 201480002879.1, 13 pages.
English Translation of First Office Action dated May 2, 2017 in Chinese Patent Application No. 201580000833.0, 9 pages.
English Translation of Second Office Action dated Jul. 6, 2017 in Chinese Application No. 201480002879.1, 14 pages.
English Translation of Third Office Action dated Oct. 16, 2017 in Chinese Application No. 201480002879.1, 4 pages.
Schwarz, J. et al., "Probabilistic Palm Rejection Using Spatiotemporal Touch Features and Iterative Classification," Proceedings of the SIGCHI Conference on Human Factors in Computing Systems, pp. 2009-2012, Apr. 26-May 1, 2014.
Hinckley et al., "Manual Deskterity: An Exploration of Simultaneous Pen+ Touch Direct Input", Proceedings of CHI, 2010, pp. 2793-2802.
Final Office Action issued for U.S. Appl. No. 15/206,554 dated Feb. 1, 2017, 20 pages.
Chinese Office Action for Chinese Patent Application No. 201280062500.7 dated Nov. 7, 2016, 9 pages.
Seo et al.., "Audio Fingerprinting Based on Normalized Spectral Subband Centroids," Proc. ICASSP, {U.S.A.), 2005, vol. 3, p. 213-216. Retrieved on May 29, 2017, 4 pages.

(56) References Cited

OTHER PUBLICATIONS

Kashino, K., "Audio fingerprinting: Techniques and applications", Acoustical Science and Technology, The Acoustical Society of Japan, Feb. 1, 2010, vol. 66, No. 2, p. 71-76. Retrieved on May 29, 2017, 6 pages.
Chinese Search Report dated Mar. 29, 2016 for Chinese Application No. 201280062500.7, 1 page.
Chinese Office Action dated Apr. 15, 2016 for Chinese Application No. 201280062500.7, 11 pages.
Japanese Office Action for Japanese Patent Application No. 2014-537253 dated Nov. 15, 2016, 3 pages.
Japanese Office Action for Japanese Patent Application No. 2014-537253 dated Apr. 26, 2016, 3 pages.
Communication pursuant to Article 94(3) EPC for EP Application No. 12842495.9 dated Jun. 18, 2018, 4 pages.
Non-Final Office Action received for U.S. Appl. No. 14/684,407 dated Jul. 8, 2016, 11 pages.
Final Office Action received for U.S. Appl. No. 14/684,407 dated Jan. 18, 2017, 20 pages.
Non-Final Office Action received for U.S. Appl. No. 14/684,407 dated Aug. 2, 2017, 14 pages.
Final Office Action received for U.S. Appl. No. 14/684,407 dated Mar. 12, 2018, 14 pages.
Non-Final Office Action received for U.S. Appl. No. 14/612,089 dated May 31, 2017, 21 pages.
Final Office Action received for U.S. Appl. No. 13/887,711, dated Jun. 8, 2017, 33 pages.
Non-Final Office Action received for U.S. Appl. No. 15/075,648, dated Apr. 21, 2017, 8 pages.
Final Office Action received for U.S. Appl. No. 14/492,604, dated Mar. 17, 2017, 37 pages.
Non-Final Office Action received for U.S. Appl. No. 14/495,041, dated Nov. 25, 2016, 35 pages.
Non-Final Office Action received for U.S. Appl. No. 14/503,894, dated May 16, 2017, 33 pages.
Non-Final Office Action received for U.S. Appl. No. 13/958,427, dated Mar. 13, 2015, 50 pages.
Non-Final Office Action received for U.S. Appl. No. 13/887,711, dated Apr. 6, 2015, 36 pages.
Final Office Action received for U.S. Appl. No. 14/191,329, dated Aug. 7, 2015, 29 pages.
Non-Final Office Action received for U.S. Appl. No. 14/492,604, dated Oct. 1, 2015, 16 pages.
Non-Final Office Action received for U.S. Appl. No. 14/483,150 dated Dec. 18, 2015, 7 pages.
Non-Final Office Action received for U.S. Appl. No. 14/503,894, dated Dec. 30, 2015, 18 pages.
Non-Final Office Action—dated Jan. 29, 2016 U.S. Appl. No. 14/219,919, 11 pages.
Final Office Action dated Feb. 24, 2016 U.S. Appl. No. 13/887,711, 23 pages.
International Search Report and Written Opinion for PCT/US2015/014581; dated May 14, 2015, 7 pages.
Search Report dated Apr. 21, 2017 in Chinese Patent Application No. 201580000833.0, 1 page.
Kherallah, M et al., "On-line handwritten digit recognition based on trajectory and velocity modeling," Pattern Recognition Letters, vol. 29, Issue 5, pp. 580-594, Apr. 1, 2008.
Non-Final Office Action dated Apr. 19, 2017 in U.S. Appl. No. 14/869,998, 7 pages.
Chinese Office Action for Chinese Patent Application No. 201280062500.7, dated Apr. 27, 2018, 19 pages (with English Translation).
Chinese Office Action for Chinese Patent Application No. 201280062500.7, dated Oct. 10, 2018, 14 pages.
Office Action dated Mar. 30, 2018 for U.S. Appl. No. 15/886,562, 44 pages.
Office Action dated Aug. 10, 2018 for U.S. Appl. No. 15/886,562, 86 pages.
Office Action dated Jan. 28, 2019 for U.S. Appl. No. 15/836,798, 30 pages.
Chinese Office Action dated Apr. 21, 2017 for Chinese Patent Application No. 201480022056.5, 23 pages. (with Translation).
Chinese Office Action dated Feb. 9, 2018 for Chinese Patent Application No. 201480022056.5, 19 pages. (with Translation).
Communication pursuant to Article 94(3) EPC for European Patent Application No. 15842839.1 dated Apr. 9, 2019, 7 pages.
European Search Report dated Apr. 8, 2019 for European Application No. 18195588.1, 7 pages.
Chinese Office Action for Chinese Patent Application No. 201280062500.7 dated Apr. 17, 2017,15 pages (including English Translation).

\* cited by examiner

Combining classification confidences with event sequence weights

Possible interpretation: finger, finger = 0.85*0.45*0.45 = .172 (most likely result)

Possible interpretation: finger, knuckle = 0.85*0.55*0.10 = .047

Possible interpretation: knuckle, knuckle = 0.15*0.55*0.35 = .029

Possible interpretation: knuckle, finger = 0.15*0.45*0.10 = .007

FIG. 4

METHOD FOR IMPROVING ACCURACY OF TOUCH SCREEN EVENT ANALYSIS BY USE OF SPATIOTEMPORAL TOUCH PATTERNS

CROSS-REFERENCE TO RELATED APPLICATIONS

This application is a continuation of and claims the benefit of priority under 35 U.S.C. § 120 of U.S. patent application Ser. No. 14/495,041, filed 24 Sep. 2014, entitled, "METHOD FOR IMPROVING ACCURACY OF TOUCH SCREEN EVENT ANALYSIS BY USE OF SPATIOTEMPORAL TOUCH PATTERNS", which application is incorporated herein by reference in its entirety for all purposes.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present invention relates generally to the field of touch screen technology and more particularly to the use of known non-random patterns of touch events to increase the accuracy of the analysis of touch screen events.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Various electronic devices today are typically operated by a user interacting with a touch screen. This feature is particularly a characteristic of the recent generation of smart phones. Typically, touch screen display screens respond to finger contact to activate the display for further processes. Contact may also be nude using tools such as a stylus, other parts of the hand such as the palm and various parts of the finger. In many of these systems, touch type classification accuracy is not 100%. Put simply, sometimes the input type is confused. Thus, there is a need for mechanisms to help reduce errors.

BRIEF SUMMARY

Embodiments of the present invention include a method of analyzing touch screen events based on characterization of features derived from each touch event. The method comprises detecting touch events on a touch sensitive surface; generating vibro-acoustic waveform signals using at least one sensor detecting each such touch event; converting the waveform signals into at least a domain signal; extracting distinguishing features from said domain signal; and classifying said features to analyze the domain signal by employing spatiotemporal event data to weight the analysis of the touch events.

Other aspects and advantages of the present invention can be seen on review of the drawings, the detailed description and the claims, which follow.

BRIEF DESCRIPTION OF THE DRAWINGS

The included drawings are for illustrative purposes and serve only to provide examples of possible structures and process steps for the disclosed techniques. These drawings in no way limit any changes in form and detail that may be made to embodiments by one skilled in the art without departing from the spirit and scope of the disclosure.

FIG. 4 illustrates how combining classification confidence levels and event sequence weights alters the likely result of the analysis.

DETAILED DESCRIPTION

Figure 1:
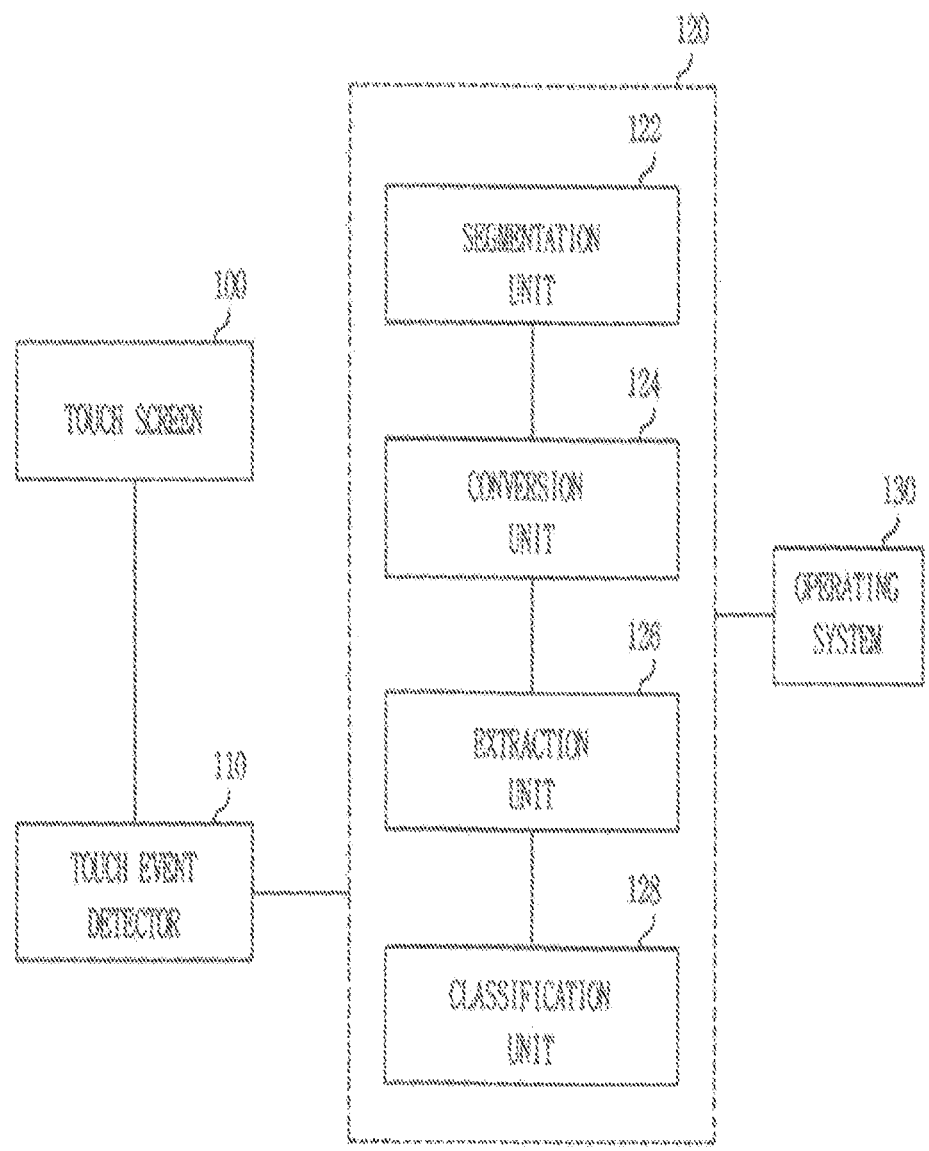
FIG. 1 is a block diagram of a computing system for analyzing a touch screen event.

Embodiments of the present invention takes advantage of the fact that humans and user interfaces generate non-random patterns of events. Put simply, after one touch event, certain actions are more likely to follow than others. For example, if the system sees a palm touch, which then disappears (presumably lifted from the screen), and then sees a new touch event in the same position within 300 ms, it is much more likely that the user has re-rested their palms, than moved a finger underneath their previous palm position at high velocity. Another example of an action is a double touch with the knuckle (i.e., a "double knock"). These usually occur in quick succession—"knock knock"—often within $500 ms and within the same region of the screen. Thus if a touch event is classified as a knock, and then within 500 ms a new event in a similar location occurs, but the classification confidence is low (e.g., 60% nail, 40% knuckle), the classifier may add weight to a knuckle classification since this touch sequence is far more likely. Put succinctly, knowledge about the probabilities of follow-on touch events can be used to bias subsequent classification, adding weight to particular events. Additionally, events do not have to be the same touch type. For example, if a double knock event is frequently followed by a swipe with the fingertip and rarely with a third knock, if a third event occurs (meeting the necessary spatiotemporal criteria), the classifier will weigh the tip swipe as the more likely classification. Such temporal patterns may be "learned" over a period of time in response to actual sequences of users thereby developing a personalized history of touch sequences for each individual user.

Applications of methods and apparatus according to one or more embodiments are described in this section. These examples are being provided solely to add context and aid in the understanding of the present disclosure. It will thus be apparent to one skilled in the art that the techniques described herein may be practiced without some or all of these specific details. In other instances, well known process steps have not been described in detail in order to avoid unnecessarily obscuring the present disclosure. Other applications are possible, such that the following examples should not be taken as definitive or limiting either in scope or setting.

In the following detailed description, references are made to the accompanying drawings, which form a par of the description and in which are shown, by way of illustration, specific embodiments. Although these embodiments are described in sufficient detail to enable one skilled in the art to practice the disclosure, it is understood that these examples are not limiting, such that other embodiments may be used and changes may be made without departing from the spirit and scope of the disclosure.

One or more embodiments may be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied therein.

The disclosed embodiments may include a method for analyzing touch screen events based on characterization of features derived from each touch event. The method comprises detecting touch events on a touch sensitive surface; generating vibro-acoustic waveform signals using at least one sensor detecting each such touch event; converting the waveform signals into at least a domain signal; extracting distinguishing feature from the domain signal; and classifying the features to analyze the domain signal by employing spatiotemporal event data to weight the analysis.

The disclosed embodiments may include a method of analyzing touch screen events based on characterization of features derived from each touch event. The method comprises detecting touch events on a touch sensitive surface; generating vibro-acoustic waveform signals using at least one sensor associated with the touch events; converting the waveform signals into at least one domain signal; extracting distinguishing features from the domain signal; and classifying the features to analyze the domain signal by employing spatiotemporal event data to weight analysis of the touch events.

The disclosed embodiments may include computer readable medium containing instructions for classifying multiple touch event sequences in touch screen devices to improve the accuracy of determining the characteristics of the touch events imparted to a touch screen. Execution of the program instructions by a processor may cause the processor to analyze each touch event in the sequence to determine within a level of confidence what hand part caused the touch event; determine likelihoods of possible hand part touch event sequences; and combine the level of confidence for each touch event in the sequence and the likelihoods of possible hand part sequences to produce a most likely result of what hand part actually generated each touch event in the sequence. The hand part may be at least one of a fingertip, a finger knuckle, a fingernail and a hand palm. The instructions to determine likelihoods of possible hand part touch event sequences may use elapsed time over the multiple touch event sequences to determine the likelihoods. The instructions to combine the level of confidence for each touch event in the sequence and the likelihoods of possible hand part sequences may include weighting of the confidence levels by the likelihoods. The instructions to combine may include instructions to multiply the confidence levels by the likelihoods.

In general, when using a touch screen or touch-sensitive device, touch screen events may occur when contact is made with the touch screen using tools such as a stylus, other parts of the hand such as the palm and various parts of the finger, i.e., pad, nail, knuckle, etc. Each such different type of touch mechanism produces a different type of digital signature. Moreover, each user of a touch screen device may have his or her own unique touch event characteristics resulting from anatomical differences such as fleshiness, finger size, finger shape, BMI and the like. These differences in touch event characteristics, whether the result of different user anatomies or different touch mechanisms, may be used advantageously to improve the touch screen technology by enabling different types of touch, reducing ambiguities, distinguishing between users, responding only to intentional touch events and the like. Such advantageous uses are derived from sophisticated sensor-based analysis of the touch event coupled with one or more algorithms designed to provide further analytical characteristics otherwise hidden or not readily apparent in the data generated by the touch event. By way of example, one such apparatus is disclosed in pending U.S. patent application Ser. No. 14/483,150 filed on Sep. 11, 2014 by the Applicant hereof and entitled "METHOD AND APPARATUS FOR DIFFERENTIATING TOUCH SCREEN USERS BASED ON TOUCH EVENT ANALYSIS". This co-pending application discloses that when a user touches a touch screen a mechanical force is applied to the screen resulting in mechanical vibrations that may be captured by a variety of sensors such as impact sensor, vibration sensors, accelerometers, strain gauges or acoustic sensor such as a microphone.

Once the vibro-acoustic signal has been captured, it can be converted into a series of features, for example; Average acoustic power, Standard Deviation, Variance, Skewness, Kurtosis, Absolute sum, Root Mean Square (RMS), Dispersion, Zero-crossings, Spectral centroid, Spectral density, Linear Prediction-based Cepstral Coefficients (LPCC), Perceptual Linear Prediction (PLP), Cepstral Coefficients Cepstrum Coefficients, Mel-Frequency Cepstral Coefficients (MFCC), Frequency phases (e.g., as generated by an FFT).

Simultaneously, many touch screen technologies are able to digitize several aspects of a touch event, such as the shape, size, capacitance, orientation, pressure, etc. The latter may be used as distinguishing features, or such features can be derived from them.

Because human fingers vary in their anatomical composition, their acoustic and touch properties can vary between humans. Moreover, the way users touch a screen can also be distinguishing (e.g., what finger, what part of the finger, how flat, how hard). Thus, the vibro-acoustic features and touch features contain properties that can be characteristic of different users and different parts of user's hands (e.g., finger tip, knuckle, nail).

It is thus possible to provide a classifier that can run on a touch computing device that upon receipt of a touch event, makes a guess about which user is operating the device, or whether the user is authorized or has any personalized features. Alternatively, it is also possible to provide a classifier that can run on a touch computing device that upon receipt of a touch event, makes a guess about what part of the finger was used to contact the screen.

In one exemplary embodiment thereof, the disclosed process may include the following operations and may include the following components;

(a) a sensing system that may be configured to continuously sample vibro-acoustic data, saving it into a buffer. This buffer can be of many lengths such as, for example 50 milliseconds;

(b) a touch sensitive screen may be configured wait for a touch event to occur. Any number of touch technologies may be possible. The operations of the touch sensitive screen may be configured to operate in parallel with the sensing system;

(c) when the touch sensitive screen detects a touch event, it may be configured to trigger a conversion, feature extraction, and classification process:

(d) the data from the vibro-acoustic buffer is retrieved. Because the touch screens typically have some latency, it may be necessary to look backwards in the buffer to find the vibro-acoustic waveform that corresponds to the touch impact (e.g., if the touch screen has a 20 ms latency, it may be necessary to look back in the buffer 20 ms to find the corresponding vibro-acoustic event). All or part of the buffer may be saved and passed to the next operations;

(e) conversion operations may be performed next. The waveform from the sensor is a time-domain representation of the vibro-acoustic signal. In addition to saving the waveform, the signal is converted into other forms. This includes filtering the waveform and transforming into other forms, including frequency domain representations;

(f) feature extraction operations may be performed next, where touch screen controller data and vibro-acoustic data are analyzed to extract features that characterize different users. For the vibro-acoustic data, features are computed for all representations of the signal;

(g) these features are then passed to a classification unit, which uses the information to label the touch event with a user (in addition to whatever the touch sensitive screen reports, e.g., X/Y position, major/minor axes, pressure, etc.);

(h) the augmented touch event is then passed to the OS or end user applications, to associate a use based on the touch event.

For some embodiments, a classifier may be configured to use one or more of the following features to perform its operations: location of touch contact (2D, or 3D in the case of curved glass or other non-planar geometry), size of touch contact (some touch technologies provide an ellipse of the touch contact with major and minor axes), rotation of the touch contact, surface area of the touch contact (e.g., in squared mm or pixels), pressure of touch (available on some touch system), shear of touch ("shear stress", also called "tangential force" in the literature, arises from a force vector perpendicular to the surface normal of a touch screen. This is similar to normal stress—what is commonly called pressure—which arises from a force vector parallel to the surface normal."), number of touch contacts, capacitance of touch (if using a capacitive touch screen), swept frequency capacitance of touch (if using a swept frequency6 capacitive touch screen), and swept frequency impedance of touch (if using a swept frequency capacitive touch screen). The computation phase may also compute the derivative of the above features over a short period of time, for example, touch velocity and pressure velocity. Other features that the classifier may also use include shape of touch (some touch technologies can provide the actual shape of the touch, and not just a circle or ellipse), and image of the hand pose (as imaged by e.g., an optical sensor, diffuse illuminated surface with camera, near-range capacitive sensing).

The classification engine may use any number of approaches, including but not limited to basic heuristics, decision trees, Support Vector Machine, Random Forest, Naïve bayes, elastic matching, dynamic time warping, template matching, k-means clustering, K-nearest neighbors algorithm neural network, Multilayer perceptron, multinomial logistic regression, Gaussian mixture models, and AdaBoost. Additionally, the results from several different classifiers may be combined through, for example, a voting scheme.

For some embodiments, it may be possible to use different classifiers based on one or more features. For example, two classifiers could be employed, one for processing sensor waveforms with a high Standard Deviation, and another classifier for waveforms with low Standard Deviation.

By employing such classification, touch screen technologies are able to classify what type of touch event occurred. For example, some screens differentiate between finger touches and touches by the palm (which are often rejected as inadvertent input). Alternatively, some systems differentiate between finger touches and those made with a stylus. In the case of the aforementioned disclosure, the system can differentiate between e.g., fingertips, knuckles, nails, stylus and other implements.

FIG. 1 is a block diagram of a computing system for analyzing a touch event based on use of resulting signals in accordance with an embodiment of the present invention. The computing system of the embodiment may have an operating (OS), and can run various types of services or applications, known as apps. The computing system may also be equipped with a telecommunication capability that can allow connections to a communications network. Such a computing system may include, but not be limited to, a table top computer (e.g., Surface Computing), laptop computer, desktop computer, mobile computer, mobile internet device, mobile phone, smart-phone, PDA (Personal Digital Assistant), game console, portable media player, and the like.

Referring to FIG. 1, the computing system includes a touch screen 100, a touch event detector 110, a classifier 120 and an OS 130. The touch screen 100 is an electronic visual display and serves also as an input/output device supplementing or substituted for a keyboard, a mouse, and/or other types of devices. The touch screen 100 displays one or more interactive elements such as graphical representation for services or applications designed to perform a specific function on the computing system. Touching the interactive elements with the finger parts of user, including the conventional tip of the finger, causes the OS 130 to activate the application or service related to the interactive elements appropriate to the identified user. Fingers are diverse appendages, both in their motor capabilities and their anatomical compositions. A single digit contains different parts such as one or more knuckles, a tip, pad and fingernail.

When an object strikes a certain material, vibro-acoustic waves propagate outward through the material or along the surface of the material. Typically, interactive surfaces use rigid materials, such as plastic or glass, which both quickly distribute and faithfully preserve the signal. As such, when one or more fingers touch or contact the surface of the touch screen 100, vibro-acoustic responses are produced. The vibro-acoustic characteristics of the respective user fingers and their respective unique anatomical characteristics produce unique responses for each user.

Referring back to FIG. 1, the touch event detector 110 detects the touch event entailing the vibro-acoustic signal. The touch event detector 110, for example, may be arranged at a rear side of the touch screen so that the vibro-acoustic signal caused by the touch event can be captured. The touch event detector 110 can be triggered by the onset of the vibro-acoustic signal resulting from the touch event. To capture the touch event and subsequent vibro-acoustic signal, the touch event detector 110 may include one or more impact sensors, vibration sensors, accelerometers, strain gauges, or acoustic sensors such as a condenser microphone a piezoelectric microphone, MEMS microphone and the like. Once the vibro-acoustic signal has been captured by the touch event detector 110, the vibro-acoustic classifier 120 processes the vibro-acoustic signal to analyze the touch event that activated the touch screen.

The OS 130 runs the computing system so that the function can be activated in line with the classification of the vibro-acoustic signals and the corresponding user. The vibro-acoustic classifier 120 includes a segmentation unit 122 to segment the vibro-acoustic signal into a digital representation; a conversion unit 124 to convert the digitized vibro-acoustic signal into an electrical signal; a feature extraction unit 126 to derive a series of features from the electrical signal; and a classification unit 128 to classify touch characteristics using the above-described features to analyze the touch event as will be further described below.

The segmentation unit 122 samples the vibro-acoustic signal, for example, at a sampling rate of 96 kHz, using a sliding window of 4096 samples of the vibro-acoustic signal. The conversion unit 124 then performs, for example, a Fourier Transform on sampled time-dependent vibro-acoustic signal to produce an electrical signal having frequency domain representation. For example, the Fourier Transform of this window may produce 2048 bands of frequency power.

The vibro-acoustic classifier 120 may further downsample this data into additional vectors (i.e., buckets often), providing a different aliasing. In addition, additional time-domain features may be calculated from the vibro-acoustic signal, such as the average absolute amplitude, total absolute amplitude, standard deviation of the absolute amplitude, the center of mass for both the segmented input signal and the Fourier Transformed signal, and zero crossings.

The feature extraction unit 126 may also calculate a series of features from the frequency domain representation of the vibro-acoustic signals, such as the fundamental frequency of the impact waveform. The classification unit 128 classifies the vibro-acoustic signal using the features to for example distinguish what user generated the touch event, so that the computing system may selectively activate a function related to the identified user depending on the classified vibro-acoustic signals. To aid classification, the user can provide supplemental training samples to the vibro-acoustic classifier 120.

Figure 2:
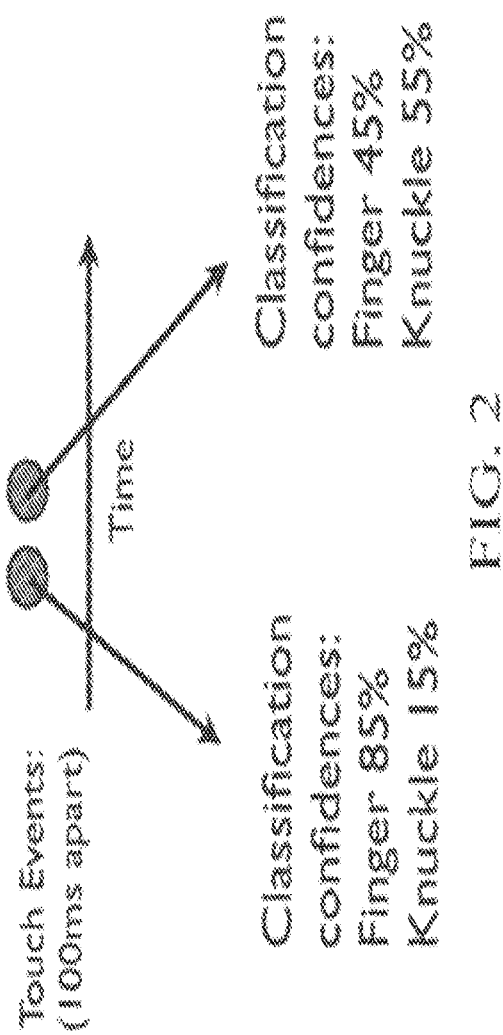
FIG. 2 shows one example of a rapid sequence of two touch events (within 100 ms) relying on classification confidence levels alone.
Figure 3:
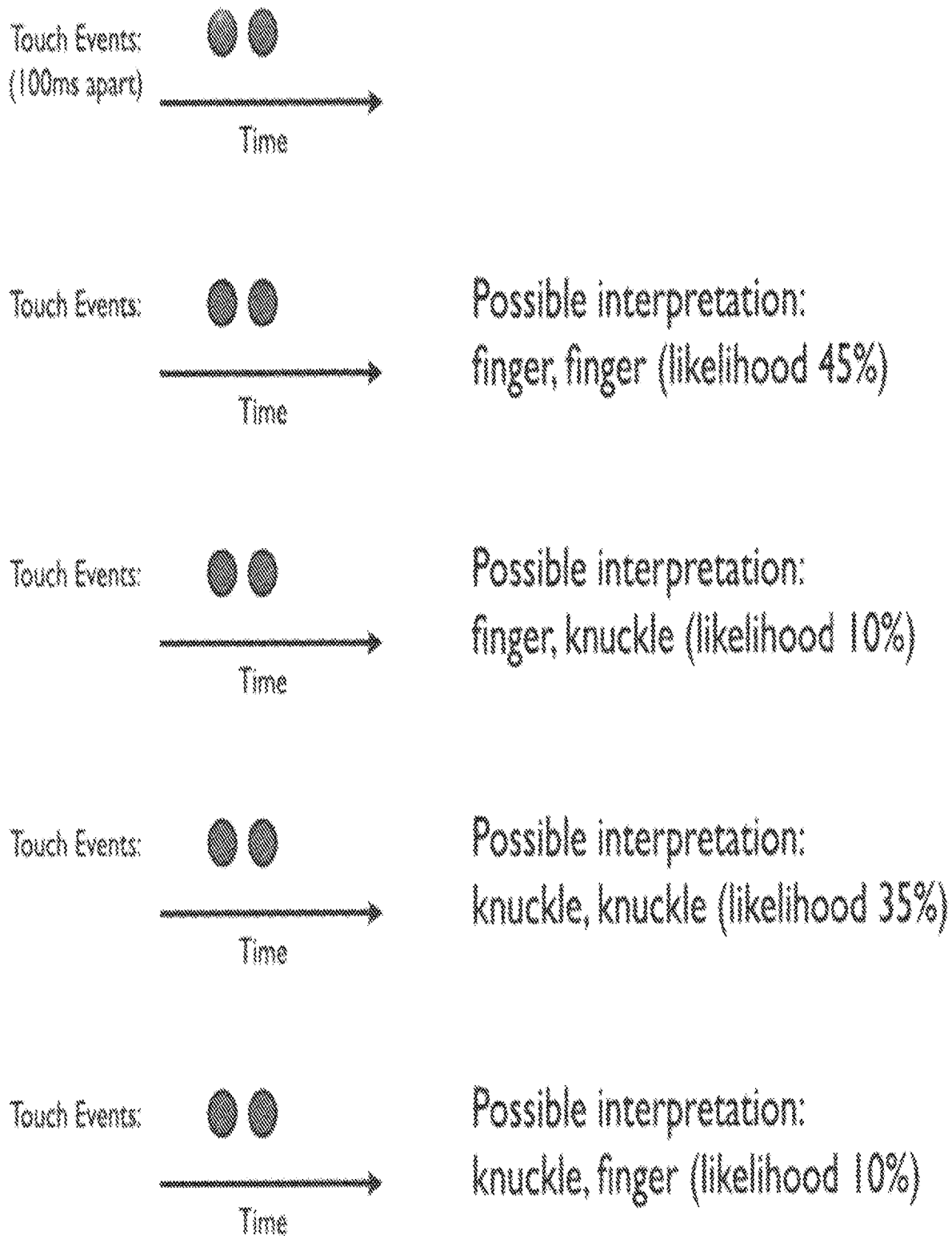
FIG. 3 illustrates graphically the event sequence weights derived from spatiotemporal historical data for four different possible interpretations of the two touch rapid sequence of FIG. 2.

For some embodiments, the classification unit 128 may be implemented with a support vector machine (SVM) for feature classification. The SVM is a supervised learning model with associated learning algorithms that analyze data and recognize patterns, used for classification and regression analysis. The classification process may be made more accurate by exploiting or leveraging known spatiotemporal patterns generated from historical data relating to sequences of multiple touch events within relatively short time windows. By way of example, FIG. 2 illustrates two touch events that occur 100 milliseconds apart. Normally, as shown further in FIG. 2, the first such touch event would be classified as a finger touch rather than a knuckle touch based on an 85% finger versus 15% knuckle classification confidence level. Moreover, the second such touch event would be classified as a knuckle event rather than a finger event based on a 55% knuckle versus 45% finger classification confidence level. These individual touch event confidence levels are provided as examples of typical classification processes that would therefore produce a result in which the analysis would indicate a finger, knuckle sequence. However, in the method of the present invention, event sequence weights are generated based on a history of spatiotemporal data and such weights may alter the results of the classification process. By way of example, the four possible finger and knuckle sequence combinations for two touch events 100 milliseconds apart are shown in FIG. 3, As shown therein, based upon such spatiotemporal data, a possible finger, finger interpretation has a likelihood of 45%. A possible finger, knuckle interpretation has a likelihood of 10%. A possible knuckle, knuckle interpretation has a likelihood of 35%. Finally, a possible knuckle, finger interpretation has a likelihood of 10%.

These likelihood figures are used herein for purpose of illustration only, however one can see that in two touch events only 100 milliseconds apart, it is far more likely that both events would come from the same hand part (i.e., both finger or both knuckle) simply because it would be less likely for a user to change hand parts in such a short period of time. On the other hand, if the time period were greater (i.e., >500 ms) then the greater opportunity for changing hand parts in that greater time period, would raise the likelihood of a finger, knuckle or knuckle, finger interpretation.

In any event, once these event sequence weights are accessed, they may be used to alter the classification by combining classification confidences with such sequence weights. One example of such combining, by for example multiplication is shown in FIG. 4. In the equations of FIG. 4, the first two numbers for each possible interpretation of the two touch event sequence of FIG. 2, are classification confidences and the third number is the likelihood derived from the spatiotemporal data as depicted in FIG. 3. Thus, for example, in the equation for the finger, finger interpretation of FIG. 4, the first two numbers are 85% (first finger) and 45% (second finger) from FIG. 2 and the third number is 45% (likelihood for finger, finger).

By carrying out the multiplications of FIG. 4, it is seen that the weighted results are 0.127 for finger, finger; 0.047 for finger, knuckle; 0.029 for knuckle, knuckle; and 0.007 for knuckle, finger. Thus, using spatiotemporal weighting, the classification most likely result is finger, finger rather than finger, knuckle which would be the result without such weighting. It should be noted that weighting techniques other than simple multiplication are also contemplated.

Figure 5:
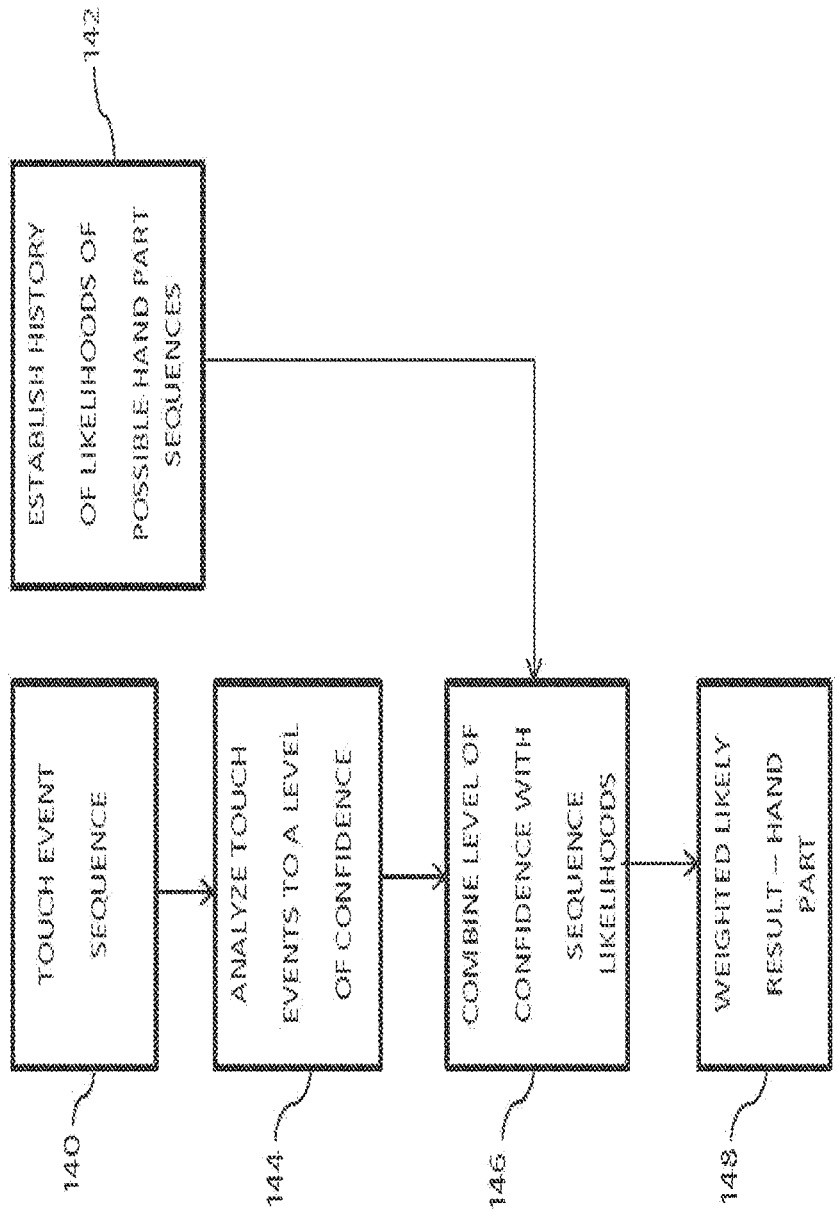
FIG. 5 is a flow chart diagram of an exemplary embodiment of the method of the invention.

FIG. 5 is a flow chart representation of an embodiment of the method described herein. As shown therein, a touch event sequence 140 results in a touch event analysis step 144, which selects a hand part based on a higher level of confidence. Either prior to the touch event or concurrently therewith, a history of likelihoods of possible hand part touch sequences is established in step 142 and these data are combined in step 146 with the results of step 144 to produce a weighted likely result in step 148.

These and other aspects of the disclosure may be implemented by various types of hardware, software, firmware, etc. For example, some features of the disclosure may be implemented, at least in part, by machine-readable media that include program instructions, state information, etc., for performing various operations described herein. Examples of program instructions include both machine code, such as produced by a compiler, and files containing higher-level code that may be executed by the computer using an interpreter. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory ("ROM") and random access memory ("RAM").

Any of the above embodiments may be used alone or together with one another in any combination. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

While various embodiments have been described herein, it should be understood that they have been presented by way of example only, and not limitation. Thus, the breadth and scope of the present application should not be limited by any of the embodiments described herein, but should be defined only in accordance with the following and later-submitted claims and their equivalents.

What is claimed is:

1. A system for analyzing touch events based on characterization of features derived from the touch events, the system comprising:
    a touch sensitive surface for receiving touch events thereon;
    at least one sensor for generating vibro-acoustic waveform signals associated with the touch events;
    a touch event detector for detecting the touch events, including an initial touch event from an initial hand part and a subsequent touch event, on the touch sensitive surface;
    a classifier module for:
        converting the vibro-acoustic waveform signals into at least one domain signal;
        extracting distinguishing features from the at least one domain signal; and
        classifying the distinguishing features of the subsequent touch event by employing spatiotemporal data relating to historical patterns for different sequences of hand parts causing historical initial and subsequent touch events, wherein the classifying uses the spatiotemporal data to derive different likelihoods for different hand parts causing the subsequent touch event, which occurs after the initial hand part caused the initial touch event, to determine which subsequent hand part from the different hand parts caused the subsequent touch event, and wherein the different hand parts include a finger knuckle, a fingertip, a palm, and a fingernail.

2. The system recited in claim 1, wherein the historical patterns associated with the spatiotemporal data comprises data from prior sequence of multiple touch events over a selected time period.

3. The system recited in claim 1, wherein the spatiotemporal data comprises data suggesting a likelihood of each touch event after a first of a plurality of touch events over a selected time period.

4. The system recited in claim 1, wherein the historical patterns associated with the spatiotemporal data is accumulated and stored in advance of the classifying.

5. The system recited in claim 1, wherein the classifying the distinguishing features comprises multiplying spatiotemporal event likelihood by classification confidences.

6. The system of claim 1, further comprising an operating system for activating a function with respect to the touch sensitive surface, wherein such function is based on classifying the distinguishing features.

7. A system for classifying a sequence of multiple touch events in touch screen devices to improve accuracy of determining characteristics of touch events imparted to a touch screen, the system comprising:
    a touch screen for receiving the touch events imparted thereon;
    a classifier module for:
        analyzing each touch event in said sequence to determine within a level of confidence what hand part caused a touch event;
        determining likelihoods of different sequences of possible hand part touch events based on spatiotemporal event data relating to historical patterns of different sequences of hand parts that cause the different sequences of touch events; and
        combining the level of confidence for each touch event in said sequence and the likelihoods of different sequences of the possible hand part touch events to produce a most likely result of what hand part actually generated the touch event in the sequence, wherein such hand part is selected from among a fingertip, a finger knuckle, a fingernail, and a hand palm.

8. The system recited in claim 7, wherein the determining uses elapsed time over the sequence of multiple touch events to determine the likelihoods.

9. The system recited in claim 7, wherein the combining comprises weighting the confidence levels by the likelihoods.

10. The system recited in claim 7, wherein the combining comprises multiplication of the confidence levels by the likelihoods.

11. A method of analyzing touch events based on characterization of features derived from the touch events, the method comprising:
    detecting the touch events, including an initial touch event from an initial hand part and a subsequent touch event, on a touch sensitive surface;
    generating vibro-acoustic waveform signals using at least one sensor associated with the touch events;
    converting the vibro-acoustic waveform signals into at least one domain signal;
    extracting distinguishing features from the at least one domain signal;
    classifying the distinguishing features of the subsequent touch event by employing spatiotemporal data relating to historical patterns for different sequences of hand parts causing historical initial and subsequent touch events, wherein the classifying uses the spatiotemporal data to derive different likelihoods for different hand parts causing the subsequent touch event, which occurs after the initial hand part caused the initial touch event, to determine which subsequent hand part from the different hand parts caused the subsequent touch event, and wherein the different hand parts include a finger knuckle, a fingertip, a palm, and a fingernail; and
    activating a function with respect to the touch sensitive surface, wherein such function is based on classifying the distinguishing features.

12. The method of claim 11, wherein the historical patterns associated with the spatiotemporal data comprises data from prior sequence of multiple touch events over a selected time period.

13. The method of claim 11, wherein the spatiotemporal data comprises data suggesting a likelihood of each touch event after a first of a plurality of touch events over a selected time period.

14. The method of claim 11, wherein the historical patterns associated with the spatiotemporal data is accumulated and stored in advance of the classifying.

15. The method of claim 11, wherein the classifying the distinguishing features comprises multiplying spatiotemporal event likelihood by classification confidences.

* * * * *